United States Patent

[11] 3,571,641

[72] Inventor Carl G. Catalano
 Manchester, Tenn. (226 Curtis Drive SE,
 Hintsville, Ala. 35803)
[21] Appl. No. 817,941
[22] Filed Apr. 21, 1969
[45] Patented Mar. 23, 1971

[54] WATER COOLED SPARK PLUG
 2 Claims, 1 Drawing Fig.
[52] U.S. Cl. .................................................. 313/11.5,
 123/169, 313/118, 313/120
[51] Int. Cl. ...................................................... H01t 13/06,
 H01t 13/16
[50] Field of Search .......................................... 313/11.5,
 118, 120, 135, 136, 137, 143; 123/169

[56] References Cited
 UNITED STATES PATENTS
 2,017,364 10/1935 Anderson .................... 313/11.5

FOREIGN PATENTS
17,814 12/1913 France ........................ 313/11.5
559,201 6/1923 France ........................ 313/11.5
562,365 8/1923 France ........................ 313/11.5

*Primary Examiner*—Roy Lake
*Assistant Examiner*—E. R. LaRoche
*Attorneys*—Harry A. Herbert, Jr. and Ruth G. Codier ABSTRACT: The electrode of the spark plug is extended beyond that of standard plug and is surrounded with insulation. The protruding portion of the electrode and its insulating jacket is also provided with spaced concentric copper jackets which provide ducts for running water. An inlet for one duct and an outlet for the other, together with termination of the inner jacket to provide space at each end for communication and allow continuous flow of water or other cooling fluid.

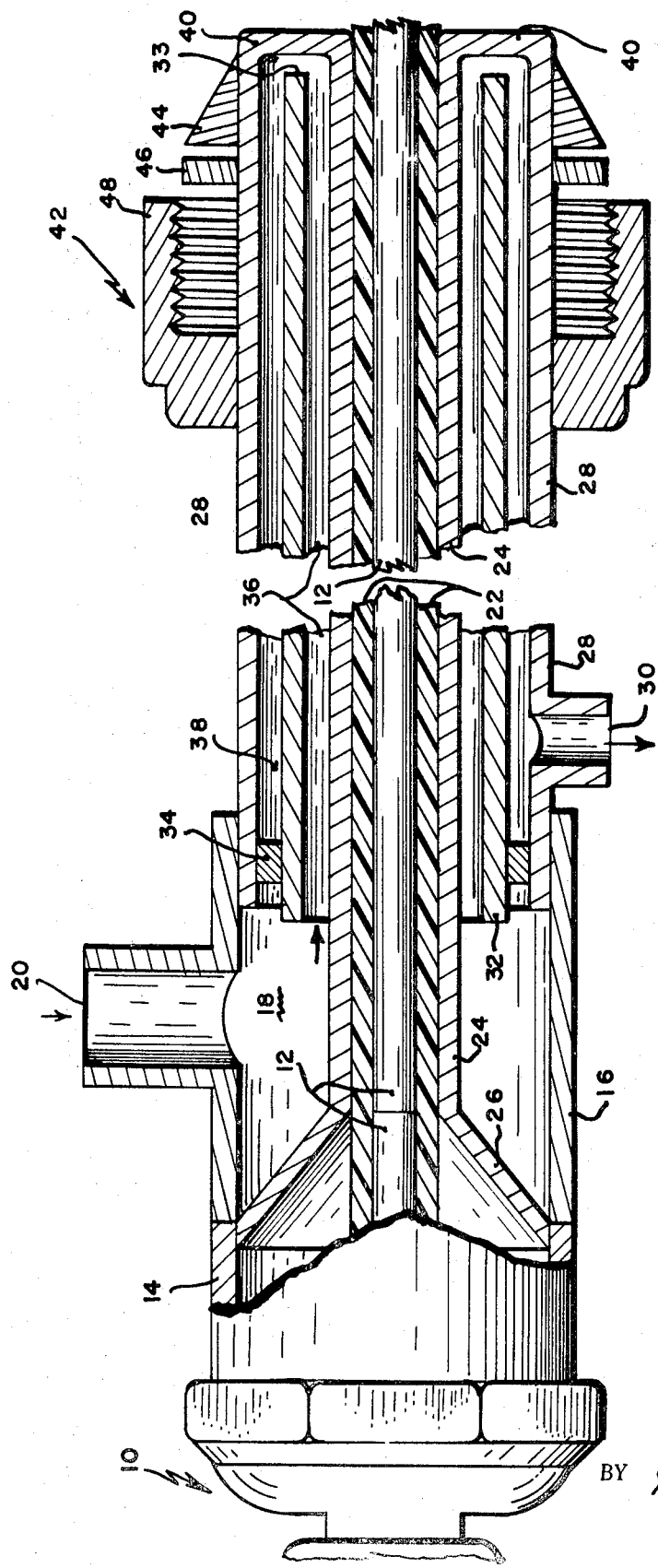

WATER COOLED SPARK PLUG

BACKGROUND OF THE INVENTION

The present invention relates to a water cooled spark plug, and more particularly to the provision of concentric water jackets surrounding the electrode and providing continuous cooling through continuously running water.

In rocket motors and like environments where combustion takes place in hydrogen or oxygen rich atmospheres, the usual carbon steel spark plugs oxidize, melt, burn up or otherwise, causing danger and damage and impeding successful operation. Wherever high voltage is required for delivering high quantities of electrical energy, for example, to the combustion chamber of a jet engine, serious problems arise through the disintegration of spark plug components.

SUMMARY OF THE INVENTION

The object of the present invention is the provision of a spark plug of such enduring construction that the electrode element will withstand the conditions of extreme heat imposed upon it. The invention provides a new method of preventing deterioration of the electrode by providing an effective method of water cooling.

A further object of the invention is the provision of a specific construction of elements for cooling and insulating an electrode. The construction comprises an insulating jacket and two ducts, concentric with the electrode, through which water or other effective coolant fluid can continuously flow. Three concentric copper jackets provide these two ducts.

A further object of the invention is the provision of a variable depth feature. Furthermore the simplicity of design permits fabrication without machining.

An inner duct communicating with a fluid inlet is separated from the electrode only by a layer of insulation and a copper jacket. The inner and outer jackets are joined at the spark plug end in a manner to form a water inlet chamber, and seal the cooling system from the spark plug. At the distal end, the inner and outer jackets are also joined, the intermediate jacket terminating short of the ends of the other two, so that communication and continuous flow is provided from the inner duct, which communicates with the inlet, and the outer duct which leads to the outlet.

Tubing diameters can be changed to accommodate changed environments.

These and other advantages, features and objects of the invention will become more apparent from the following description taken in connection with the illustrative embodiment in the accompanying drawing.

DESCRIPTION OF THE DRAWING

The FIGURE of the drawing is a fragmentary view, partly in cross section, of a portion of a spark plug, showing the elongated electrode and the duct system for fluid cooling.

DESCRIPTION OF THE PREFERRED EMBODIMENT

A spark plug is represented by the numeral 10 and is shown in a fragmentary manner. The electrode 12 of the spark plug 10 is extended a distance of the order of 6 inches beyond the usual.

The spark plug base wall 14 is continued as shown at 16 and a water chamber 18 is provided for receiving cooling fluid through an inlet 20. A cooling system is constructed as follows: The electrode 12 is insulated by a jacket 22 extending the length of the cooling system, and into the spark plug body 10. This insulating jacket may be ceramic bead or any other suitable material adequate of this particular insulating purpose. Immediately surrounding the insulating jacket 22 is a copper jacket 24. The jacket 24 terminates in a wall section 26a which is connected to the wall section 16 with silver solder or some equivalent sealing substance, and in a manner to seal the space 18 from the spark plug base and seal the water chamber 18 for the spark plug body.

Continuing the wall 16 and sealed to it is an outer copper jacket 28 provided with a fluid outlet 30. A third and intermediate jacket 32 is positioned by means of a bulkhead 34 between the jackets 24 and 28 to separate the space into two ducts, an inner duct 36 nearest the electrode and an outer duct 38, leading to the outlet 30.

The bulkhead 34 seals the outer duct 38 at the spark plug end so that fluid entering the chamber 18 flows into the inner duct 36. The inner jacket 32 and the outer jacket 28 are joined at 40, the intermediate jacket 33 terminating to allow communication around its end from inner duct to the outer duct and to the outlet 30.

An adjustable swagelock 42, comprised of rings 44 and 46 and nut 48, provide the advantages of variable depth.

Although the invention has been described with reference to a particular embodiment, it will be understood to those skilled in the art that the invention is capable of a variety of alternative embodiments within the spirit and scope of the appended claims.

I claim:

1. In a water cooled spark plug, a cylindrical wall element comprising the base of said plug, an extended electrode element protruding a distance from said base, an insulating covering surrounding the protruding portion of said electrode, a cylindrical wall element sealed to said spark plug base in a fluidtight manner and forming a continuation thereof, a fluid inlet in said element, an outer tubular jacket secured to said wall element, an inner tubular jacket covering said insulation and sealed to said wall element and to said outer jacket in fluidtight manner, an outlet in said outer jacket, said inner and outer jackets being joined and sealed to form a fluid inlet chamber capable of receiving cooling fluid, said inner and outer jackets being also joined and sealed at their distal ends, an intermediate tubular member located between said outer jacket and said inner jacket to form an inner flow space and an outer flow space, said intermediate element terminating at both its ends a distance from the termination of said inner and outer jackets to allow communication and continuous flow from one fluid flow space to the other, a bulkhead provided at said fluid inlet chamber between said intermediate jacket and said outer jacket so that fluid entering said inlet enters the inner flow space adjacent to said electrode and reaches said fluid outlet through the outer flow space.

2. In a water cooled spark plug as claimed in claim 1, means in the form of a swagelock assembly applied to said outer jacket for providing adjustment of the spark plug depth.